(12) United States Patent
Mazaudier

(10) Patent No.: US 9,837,174 B2
(45) Date of Patent: Dec. 5, 2017

(54) METAL NUCLEAR-FUEL PIN INCLUDING A SHELL HAVING THREADS OR FIBERS MADE OF SILICON CARBIDE (SIC)

(75) Inventor: Fabrice Mazaudier, Manosque (FR)

(73) Assignee: Commissariat A L'Energie Atomique et aux Energies Alternatives, Paris (FR)

( * ) Notice: Subject to any disclaimer, the term of this patent is extended or adjusted under 35 U.S.C. 154(b) by 1185 days.

(21) Appl. No.: 13/878,318

(22) PCT Filed: Oct. 4, 2011

(86) PCT No.: PCT/EP2011/067308
§ 371 (c)(1),
(2), (4) Date: Jun. 18, 2013

(87) PCT Pub. No.: WO2012/045740
PCT Pub. Date: Apr. 12, 2012

(65) Prior Publication Data
US 2013/0329849 A1    Dec. 12, 2013

(30) Foreign Application Priority Data

Oct. 7, 2010 (FR) ..................................... 10 58149

(51) Int. Cl.
*G21C 3/06* (2006.01)
*G21C 3/07* (2006.01)
*G21C 3/60* (2006.01)

(52) U.S. Cl.
CPC .................. *G21C 3/07* (2013.01); *G21C 3/60* (2013.01); *Y02E 30/38* (2013.01)

(58) Field of Classification Search
CPC ... G21C 1/16; G21C 3/02; G21C 3/04; G21C 3/041; G21C 2003/045; G21C 2003/047;
(Continued)

(56) References Cited

U.S. PATENT DOCUMENTS 3,230,150 A    1/1966 Martin et al.
3,291,700 A    12/1966 Brossa et al.
(Continued)

FOREIGN PATENT DOCUMENTS

EP    0409405 A2    1/1991
EP    0595571 A1    5/1994
(Continued)

OTHER PUBLICATIONS

Kim et al., "Development of SFR Fuel Cladding Tube Materials" Presentation at the International Conference on Fast Reactors and Related Fuel Cycles, Dec. 2009.*
(Continued)

*Primary Examiner* — Jack W Keith
*Assistant Examiner* — Sharon M Davis
(74) *Attorney, Agent, or Firm* — Baker Hostetler LLP

(57) ABSTRACT

A nuclear-fuel pin including a linear element made of a metal nuclear-fuel material consisting of uranium and/or plutonium, and cladding including Fe and Cr or an alloy including at least both of said elements, comprises a main shell provided around the linear nuclear-fuel element, said shell including threads or fibers made of SiC. A method for producing a nuclear-fuel pin is also provided.

15 Claims, 3 Drawing Sheets

(58) Field of Classification Search
CPC ............ G21C 2003/06; G21C 2003/07; G21C 2003/16; G21C 2003/17; G21C 2003/18; G21C 2003/20; G21C 2003/60; G21C 2003/626

See application file for complete search history.

(56) References Cited

U.S. PATENT DOCUMENTS

| | | | | |
|---|---|---|---|---|
| 3,619,366 | A | * | 11/1971 | Chubb ................ G21C 3/16 376/418 |
| 4,710,343 | A | | 12/1987 | Christiansen et al. |
| 4,894,203 | A | | 1/1990 | Adamson |
| 4,924,033 | A | * | 5/1990 | Iyogi ................ B23K 35/025 174/152 GM |
| 4,971,753 | A | | 11/1990 | Taylor, Jr. et al. |
| 5,227,129 | A | | 7/1993 | Bryan et al. |
| 5,301,218 | A | | 4/1994 | Taylor, Jr. et al. |
| 5,412,701 | A | | 5/1995 | Glazman et al. |
| 6,246,740 | B1 | * | 6/2001 | Maruyama ............ C04B 35/571 376/327 |
| 8,149,984 | B2 | | 4/2012 | Ravenet |
| 2006/0039524 | A1 | | 2/2006 | Feinroth et al. |
| 2007/0189952 | A1 | | 8/2007 | Easler et al. |
| 2010/0303193 | A1 | * | 12/2010 | Walters ................ G21C 3/02 376/412 |
| 2012/0087457 | A1 | * | 4/2012 | Garnier ................ C04B 35/565 376/416 |

FOREIGN PATENT DOCUMENTS

| | | |
|---|---|---|
| EP | 2096643 A2 | 9/2009 |
| JP | S49-38097 B1 | 10/1974 |
| JP | H02-73192 A | 3/1990 |
| JP | H03-75591 A | 3/1991 |
| JP | H06-324169 A | 11/1994 |
| JP | H11-326571 A | 11/1999 |
| JP | 2007-269621 A | 10/2007 |
| JP | 2008-501977 A | 1/2008 |
| JP | 2009-210266 A | 9/2009 |
| WO | 2006/076039 A2 | 7/2006 |
| WO | 2007/017503 A1 | 2/2007 |

OTHER PUBLICATIONS

Olander, "Nuclear Fuels: present and future" Engineering Journal, vol. 13, Issue 1, Jan. 2009.*
Abenojar, J. et al., "Reinforcing 316L stainless steel with intermetallic and carbide particles," Materials Science and Engineering A335 (2002) pp. 1-5.
Arai, Y. et al., "Thermal Conductivity of Near-stoichiometric (U, Pu, Zr)C Solid Solutions," Journal of Nuclear Materials, 168 (1989), pp. 137-143.
Berche, A. et al., "Thermodynamic study of the U—Si system," Journal of Nuclear Materials 389 (2009) pp. 101-107.
Chevalier, P. Y. and Fischer, E., "Thermodynamic modelling of the C—U and B—U binary systems," Journal of Nuclear Materials 288 (2001) pp. 100-129.
Fischer, E., "Thermodynamic modeling of the C—Pu system," Computer Coupling of Phase Diagrams and Thermochemistry 32 (2008), pp. 371-377.
Hecker, S. S. and Stan, M., "Properties of plutonium and its alloys for use as fast reactor fuels," Journal of Nuclear Materials 383, vol. 1-2 (2008), pp. 112-118.
Kalogeropoulou, S. et al., "Relationsip Between Wettability and Reactivity in Fe/SiC System," Acta metall. mater., vol. 43, No. 3 (1995), pp. 907-912.
Kurata, M. et al., "Thermodynamic assessment of the Fe—U, U—Zr and Fe—U—Zr systems," Journal of Alloys and Compounds 271-273 (1998), pp. 636-640.
Land, C. C. et al., "The Plutonium-Silicon System," Journal of Nuclear Materials, vol. 15, No. 1 (1965), pp. 23-32.
Liu, G. W. et al., "Survey on wetting of SiC by molten metals," Ceramics International 36 (2010), pp. 1177-1188.
Pardue, W. M. and Storhok, V. W., "Plutonium Compounds for Space Power Applications," Supplement to IEEE Transactions on Aerospace (1965), pp. 577-582.
Patankar, S. N. et al., "Matrix reinforcement interaction in SiC/316L stainless steel composite," Journal of Materials Science Letters 19 (2000), pp. 613-615.

* cited by examiner

METAL NUCLEAR-FUEL PIN INCLUDING A SHELL HAVING THREADS OR FIBERS MADE OF SILICON CARBIDE (SIC)

CROSS-REFERENCE TO RELATED APPLICATIONS

This application is a National Stage of International patent application PCT/EP2011/067308, filed on Oct. 4, 2011, which claims priority to foreign French patent application No. FR 1058149, filed Oct. 7, 2010, the disclosure of which are incorporated by reference in their entirety.

FIELD OF THE INVENTION

The field of the invention is that of fourth-generation fast neutron reactors, designed to operate with fuels based on uranium and plutonium, and studied in order to meet the increasing worldwide demand for energy, in the overall context of global warming, with increased objectives in terms of performances and safety.

BACKGROUND

Several reactor designs are being studied and proposed, with different technological solutions for the [fuels/cladding/coolant] systems.

The SFR (Sodium-cooled Fast Reactor) concept, cooled with liquid sodium (operating temperature of the coolant typically 500° C.), is the subject of an international consensus. Two opinions are envisaged for the nuclear fuel: oxide fuel $(U,Pu)O_2$, by way of reference, and metal fuel, for example UPuZr (for example U-20Pu (20% of Pu)-10Zr (10% of Zr)), as an alternative. Imagined are, on the one hand, high-power SFR/oxide cores and small- or medium-power SFR/metal alternative cores corresponding to local and remote energy demands. For SFR/metal alternative cores, "battery" reactor designs are, for example, proposed, without refueling during the life of the reactor (lifetime fuelling), with heightened intrinsic safety requirements of the fuel.

Unlike the designs of current power-generating nuclear reactors (pressurized water reactors or boiling water reactors, with an oxide fuel) for which the fuel pin is made from metal cladding made of a zirconium-based alloy (zircaloy), the metal cladding of the fuels for sodium-cooled reactors is made of Fe—Cr or Fe—Cr—Ni stainless base for austenic or ferritic-martensitic alloys that are more or less sophisticated or improved (examples: grades EM10, T91, HT9, D9, ODS, or, more simply, 316L).

The metal fuel has particular features that pose at least three technological problems:

its swelling under neutron flux in the reactor, which creates a strong interaction that is damaging to the cladding (that is also encountered between the oxide fuels (fuel (or pellet)-cladding interaction) and zircaloy claddings, in current pressurized water reactors; a "classic" and recurrent problem). For metal fuel forms, the swelling today appears to be able to be controlled with a more resistant cladding, by an ad hoc metal fuel design and the choice of a lower density for the metal actinide alloy, so that the gaseous fission products can escape en masse into the plenum (free space left in the pin), whilst the generated and original porosity makes it possible to accommodate the deformation:

its low melting point (of the order of 1000° C.) making it a priori weaker during reactivity excursions and, more generally, temperature excursions;

the existence of eutectics (formation of a mixture of given composition during the interaction between two species or elements) between Fe, constituent element of the cladding, and U and Pu from the fuel material, with very low melting points (725° C. for the U—Fe eutectic [Journal of Alloys and Compounds 271-273 (1998) pp. 636-640], 420° C. for the Pu—Fe eutectic [Journal of Nuclear Materials 383, Vol. 1-2 (2008), pp. 112-118], of the order of 600° C. when U and Pu are alloyed with Zr or depending on the grade of the cladding), which may greatly degrade the performances of the first barrier by thinning and the margins with respect to safety. This eutectic also and finally limits the operating temperatures that it is possible to achieve, reducing the energy efficiency that could theoretically be obtained according to the laws of thermodynamics and the Carnot cycle. In the procedure for forming the eutectic, Zr has a very particular role since it makes it possible to increase the resistance to melting, and thereby makes it possible to increase the margins. Unfortunately, under neutron flux in the reactor, the Zr of the fuel migrates toward the center of the pin which is concomitantly depleted in this element in its peripheral portion.

Instead of helium for filling the gaps and spaces between the fuel and the cladding (He-bonding), it is possible to use sodium (Na-bonding) which greatly optimizes the thermodynamics of the system. This makes it possible to reduce the temperature gradient between the center of the fuel and the cladding and to obtain large safety margins, with respect to the melting, but unfortunately hampers the procedure for the release of gaseous fission products, and complicates the management of the irradiated fuel with respect to reprocessing. Na-bonding does not eliminate the risks linked to the formation of eutectics.

One of the major problems for the use of metal fuel is therefore the formation of this eutectic and, more generally, its low melting point.

To help to resolve this problem, three major technological principles are generally proposed, studied or implemented, beyond the filling of the rod with sodium:

the modification of the composition of the fuel metal alloy;

the choice of stainless grades that represent the best compromise between mechanical strength, resistance to irradiation and increase of the eutectic temperature;

the use of metal liners, which have been the subject of many patents, some of which are commented on below.

Indeed, there are many patents on nuclear fuel composite claddings comprising an inner liner which is usually of metallic nature, made of Zr in particular, with a diffusion barrier function, but also sometimes a specific role relating to the thermodynamics, to the internal corrosion resistance, or as a support for consumable neutron poisons, etc. Apart from a few exceptions, these patents are for the most part oriented toward use for the oxide fuel and the power-generating reactors that operate with pressurized water as coolant. Regarding the use of metal fuel, notably for the application to sodium-cooled fast reactors, patent EP 0 595 571 B1 (1997) describes the use of a composite coaxial cladding, [(outer) stainless alloy/(inner)zirconium alloy], with the inner cladding of elliptical shape, in order to optimize the thermodynamics and to minimize the occurrence of direct contact between the fuel metal alloy and the stainless cladding. The spaces created within the composite coaxial cladding may be filled with He and Na separately for optimization of the thermodynamics. It is a patent presented as an improvement of U.S. Pat. No. 4,971,753 from 1990 (EP A-0 409 405) where the concept of the composite coaxial cladding with a Zr liner is already presented. These two patents are explicitly oriented toward the use of metal fuels.

These patents refer to U.S. Pat. No. 4,894,203 (1990) where the Zr liner is modified in order to improve the internal corrosion resistance. U.S. Pat. No. 5,227,129 (1993) itself mentions the use of zirconium nitride as a liner and also a physical method for applying it. U.S. Pat. No. 5,412,701 (1995) presents the possibility of using alkali metal silicates on a zirconium base, as a support for neutron poisons.

U.S. Pat. No. 5,301,218 describes a particular technology for a liner in the shape of a rolled metal foil (several foils, like a roll of paper) and that is closed around the cylindrical fuel and welded on the outside by a particular technology ("tack welding of an inner rolled metal fuel"), everything being within the cladding. The winding turns may be deformed and become closer under the effect of a pressure or mechanical load which would be generated by the fuel.

Most of these patents directly refer, in terms of improvement, to two patents from 1996, set out in which are the technological principles of the composite coaxial cladding integrating a metallic diffusion barrier. U.S. Pat. No. 3,230,150 (1966) for the nuclear fuel $UO_2$, has a cladding formed of an inner liner (tube) made of Cu, and from an outer part made of stainless steel, which fit together ("multi-tubular cladding"). U.S. Pat. No. 3,291,700 (1966), finally, for the metal fuel of U type or alloys thereof, notably $UAl_x$ alloys, describes a method for limiting or suppressing the interactions with the metal, notably Al, cladding. The technique presented consists in winding around the fuel, irrespective of its physical form (plate or cylinder) or its chemical nature (metallic or ceramic), a metal bandage chosen in order to completely wrap it before cladding it. The method of manufacture consists in using technological systems of simple design, made of bobbins or rollers of wrapping sheets, which distribute said material in order to wrap the fuel using given rotational movements.

For high-temperature applications (for example fourth-generation gas-cooled fast reactors [GFRs]) of these designs for advanced nuclear fuel claddings comprising linings, or more generally composite material solutions, the ceramic options are preferred, due to their more refractory character which are therefore better performing than the metal options.

Patent WO 2007/017503 (2007) describes, for example, a composite honeycombed plate design, made of monolithic and fibrous SiC, and metal liners based on refractory alloys, for nuclear fuels, for example for U, Pu carbide typically, which can operate in GFRs and that operate at very high temperature, with a very restrictive specification.

For high-temperature applications, patent application WO 2006/076039 A2 (EP 1 774 534) from 2006 is also known for an SiC—SiC composite multilayer tube that is supposed to meet the specifications of fuel elements for fourth-generation lead/lithium-cooled or gas-cooled reactors, and also for the applications of fossil-fuelled power stations. Finally, the SiC is used in an original manner as a sponge material in U.S. Pat. No. 4,710,343 (1987), for cesium notably, for a fuel pin design for a fast reactor comprising, in the upper part, silicon carbide SiC in a large extended surface area form for trapping cesium.

It emerges, in summary, that for all of the solutions proposed in the known art for the application to metal fuel for SFR reactors, a certain number of problems remain and notably:
  under nominal conditions at an operating temperature of around 500° C., physico-chemical interactions between the fuel and the cladding and more particularly of the eutectic between the UPuZr metal fuel and the stainless cladding based on Fe—Cr—Ni or Fe—Cr;
  under "incidental" conditions, i.e. at a temperature above the melting point of the fuel which may typically be of the order of 1000° C., the possibility of maintaining a large volume fraction in the solid state within the cladding, with good thermal properties by reducing the local neutron reactivitiy by decreasing the fissile atom concentration while promoting the maintenance of the performances of the cladding and its geometry.

In most of the patents cited, beyond the technical effects, the questions of ease of manufacture, robustness, and cost are faced immediately for the designs of fuel pins or elements comprising liners.

For the "all ceramic" or "ceramic-metal" options in particular, the question of the assembly (manufacture, more broadly), and of the thermomechanical qualification, pose basic problems. For the "all metal" options, if the manufacturing issues are surmountable, the operational side and the amounts of metallic material to be used also pose a basic question regarding the availability and the recycling of the raw material, and therefore regarding the cost, and also regarding the methods for managing and handling fuel elements which are heavier.

SUMMARY OF THE INVENTION

The applicant starts from the principle that a significant decoupling of the functions on a system that is complex and as constrained as a nuclear fuel element under operating conditions is potentially a source of harmful technical effects, which are all the more unpredictable the larger the number of elements forming it, their interactions or couplings, and proposes in the present invention a solution that is simple in its principle and is based on a very limited number of elements in order to give rise to the chosen technical effects.

Compared to solving the stated problems relating to the behavior of the UPuZr metal fuel for SFRs, the applicant has identified no prior art that simultaneously addresses and proposes a solution of interfacial matrix liner type that is based on a system that is simple to manufacture and to use and the operation of which is on the whole reliably predictable, on the basis of physical, mechanical or chemical properties that are furthermore much studied by and well known to a person skilled in the art.

Such properties arise gradually, depending on the field of perturbations observed for the metal fuel for SFRs under the situations concerned by the present invention (temperature rise and thermal expansion, power transient without melting of the fuel, reactive or unreactive interdiffusion (with the cladding), eutectic (U—Pu—Fe) around 600° C. (case of a transient without melting), melting of the fuel around 1000° C. (accidental situation).

Within this context, one subject of the present invention is a metal nuclear fuel pin that makes it possible to overcome the aforementioned problems.

More specifically, one subject of the present invention is a nuclear fuel pin comprising a linear element of metal nuclear fuel material based on uranium and/or plutonium and a cladding comprising iron and chromium or an alloy comprising at least these two elements, characterized in that it also comprises a main shell positioned around the linear nuclear fuel element, said shell comprising yarns or fibers made of SiC.

The cladding advantageously also comprises a hollow portion (reservoir referred to as a plenum) for discharging the fission gases and a reservoir separating said hollow portion from said linear metal nuclear fuel element, enabling the correct operation of a power-generating fuel rod or pin.

According to one variant of the invention, said reservoir referred to as a plenum may receive the molten fuel and comprises an annulus made of a material which is resistant to the corrosion of molten actinides.

According to one variant of the invention, said annulus is made of tantalum (Ta).

According to one variant of the invention, the SiC constituting the fibers is of cubic β allotropic variety.

According to one variant of the invention, the shell also comprises free silicon fillers.

According to one variant of the invention, said main shell comprises strips comprising SiC yarns or fibers.

According to one variant of the invention, the main shell comprises a succession of thicknesses of SiC fibers wound around the linear metal fuel material element.

According to one variant of the invention, the pin also comprises a primary shell of silica or quartz fibers inserted between the linear fuel element and the main shell.

According to one variant of the invention, the primary shell comprises a succession of thicknesses of silica or quartz fibers wound around the linear metal fuel material element.

Another subject of the invention is a process for manufacturing a metal nuclear fuel pin according to the invention, characterized in that it comprises the production of a main shell around the linear metal nuclear fuel element by weaving or braiding SiC fibers.

According to one variant of the invention, the process comprises the production of a main shell with strips of SiC fibers wound around the linear metal nuclear fuel element.

According to one variant of the invention, the process also comprises a prior step of surface oxidation of the linear metal nuclear fuel element.

According to one variant of the invention, the process also comprises a prior step of coating the linear element with a binder comprising a soft brazing powder based on a conductive material.

According to one variant of the invention, the process also comprises the production of a primary shell between the linear metal nuclear fuel element and the main shell, said primary shell comprising silica or quartz fibers.

BRIEF DESCRIPTION OF THE DRAWINGS

The invention will be better understood and other advantages will appear on reading the description which follows, given non-limitingly and by means of the appended figures, among which.

DETAILED DESCRIPTION

Figure 1:
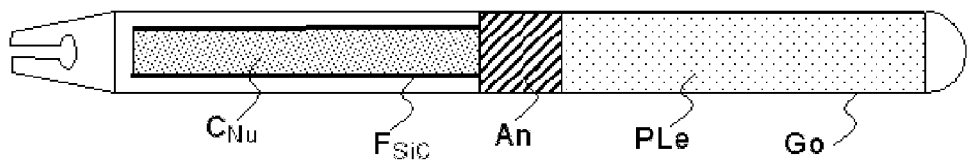
FIG. 1 schematically shows the fuel pin according to the invention.

Generally, and according to the present invention, the pin comprises, as illustrated in FIG. 1, a cladding Go made of stainless material based on Fe—Cr—Ni or Fe—Cr, a linear metal nuclear fuel element $C_{Nu}$ that may be present in the form of a bar or billet of cylindrical shape having a small diameter, typically 5 to 10 mm, it being possible for the fuel material to be of UPuZr or UPuX type with X possibly being, for example, molybdenum. The pin thus comprises a first portion comprising the fissile column of material $C_{Nu}$ and a second portion constituted by the plenum $P_{Le}$ for the gases.

Advantageously, an annulus An or liner of tantalum Ta is provided constituting a reservoir that is resistant to the corrosion of molten actinides, under operational conditions.

Advantageously, provision may be made to carry out a surface oxidation step, between 200 and 250° C., in air and for a few hours, in order to obtain a layer of a few micrometers of cubic $MO_2$ type that adheres to its substrate, M being the constituent metal alloy of the metal nuclear fuel.

For the manufacture of SiC fibers or yarns, various production processes may be envisaged and notably processes comprising steps of fiber weaving (simple and proven principle in the aeronautic field notably).

Two exemplary embodiments of the main shell based on SiC fibers will be described below.

First Exemplary Embodiment of a Pin According to the Invention:

The SiC matrix that is in the form of yarns or fibers is woven or braided along the billet using a technical device well known to a person skilled in the art. The first turns, in contact with the billet, are advantageously produced with pre-oxidized fibers or with a weaving of quartz fibers or silica $SiO_2$ fibers.

It is also possible to use borosilicate glass if it is desired to have a reserve of neutron poison, determined by the boron in the glass. Indeed, for example, boron 10 (isotope 10 of boron) captures neutrons (it is a poison for the fission reactions), in order to be converted to boron 11 which gives He+Li. The isotope $^{10}B$ (natural boron is a mixture of the isotopes $^{10}B$ (19.8 mol %)+$^{11}B$ (80.2 mol %)), has, compared to other absorbents, an effectiveness over a very broad spectrum, from fast neutrons to thermal neutrons. The capture reaction, of (n, α) type, is given below: $^{10}B+1n => 7Li+ 4He+2.6$ MeV.

The thickness determined by the number of turns and the width of the overlap of each of the turns is adjustable data. The turns are loose (not tightened).

A brazing powder (typically based on Ni to then improve the conductivity), with its liquid binder (which evaporates easily by drawing under vacuum), may advantageously be painted onto the billet before the operation for covering by weaving or braiding.

The billet that is covered and optionally painted with braze is gradually introduced into the cladding, so that the cover thus fixed does not become slack.

Figure 2:
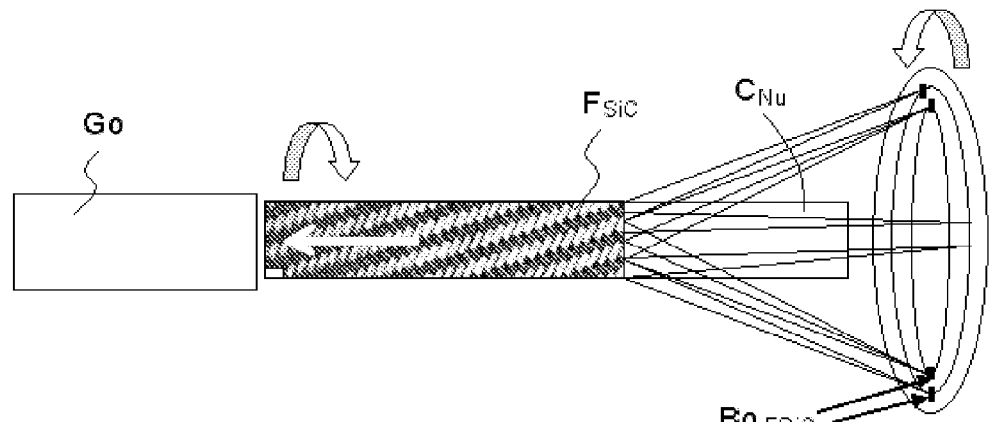
FIG. 2 illustrates a first example of a process for manufacturing the main shell included in a nuclear fuel pin according to the invention.

A schematic diagram illustrated in FIG. 2 demonstrates this example of a process for producing the main shell. A cladding Go is intended to receive a billet of nuclear fuel $C_{Nu}$, around which yarns or fibers $F_{SiC}$ of SiC are wound and, not represented, quartz fibers or $SiO_2$ fibers have been wound beforehand as a first thickness, after having been anchored in order to initiate the start of the weaving or braiding.

In order to produce this main shell with the fibers $F_{SiC}$, the fuel billet is rotated and a multilayer braiding machine comprising a flywheel and supports for braiding bobbins $Bo_{FSiC}$ is also rotatably mounted.

Second Exemplary Embodiment of a Pin According to the Invention

The SiC matrix in the form of woven fabric is draped along the billet using a pre-woven and not very dense strip based on standard SiC fibers. It is anchored for the covering operation at an anchorage point $P_A$. The first layers, in contact with the billet, are advantageously produced with pre-oxidized strips or fibers or with a weaving of quartz fibers or silica $SiO_2$ fibers or borosilicate glass fibers if it is desired to have a reservoir of neutron poison (determined by the boron in the glass). The first layers in contact with the preoxidized metal billet are constituted of $SiO_2$.

The thickness (number of layers or turns) and the width of overlap of each of the turns is adjustable data. The layers are loose (not tightened).

It is optionally possible to fill the inter-turn space with pulverulent Si or very porous SiC foam, poured as a function of and on demand into the closure space of the strip undergoing the covering operation, during rotation.

A brazing powder (typically based on Ni to then improve the conductivity), with its liquid binder (which evaporates easily by drawing under vacuum), may advantageously be painted onto the billet before the operation for covering by bondaging.

The billet that is covered and optionally painted with braze is gradually introduced into the cladding, so that the cover thus fixed does not become slack.

Figure 3:
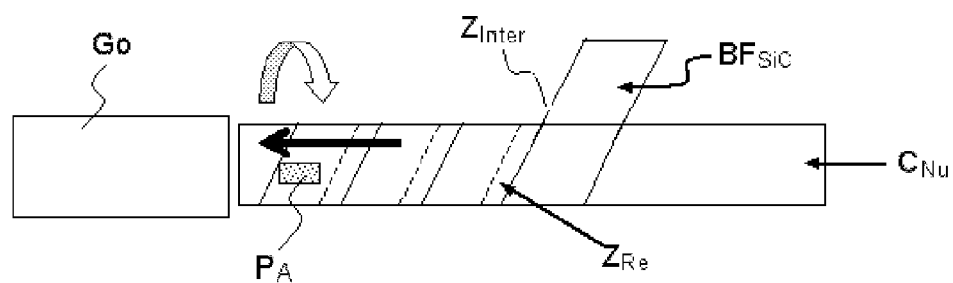
FIG. 3 illustrates a second example of a process for manufacturing the main shell included in a nuclear fuel pin according to the invention.

FIG. 3 illustrates the assembly of strips $BF_{SiC}$ around the billet of nuclear fuel $C_{Nu}$, and also the zones $Z_{inter}$ for filling the inter-turn space with Si or Si foam for example and the inter-turn overlap zones $Z_{Re}$, the horizontal arrow indicating the direction for introducing the thus wound billet into its main shell within the cladding Go.

When the covering operation is finished, the system is adjusted to the correct length (by simple radial cutting) and optionally placed under vacuum, in order to evacuate the binder of the soft braze optionally affixed, before the closure by welding, the remainder of the operations for manufacturing the pin being well known to a person skilled in the art.

Behavioral Validations of the Pin of the Present Invention under Nominal Operation at Static Temperatures of 500° C.

In this temperature range, the applicant proposes to use SiC for its good thermal and physical properties, for its excellent behavior under irradiation, notably in these temperature ranges, around 500° C., where the swelling is typically of the order of 0.5 to 1%, at a given integrated dose. The solid-state interactions, between the metal fuel and the SiC (as soon as they are in contact), are not zero but are kinetically postponed or delayed by the presence of $SiO_2$ (quartz or silica) on the weaving, in contact with the $MO_2$ layer formed by oxidation pretreatment on the metal fuel.

Figure 4:
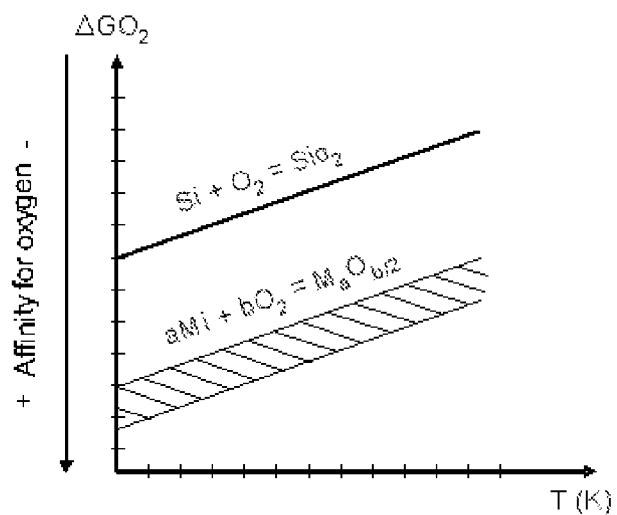
FIG. 4 illustrates the affinities for oxygen of silicon, uranium, zirconium.

Thermodynamically, it is well known that the affinity of silicon Si for oxygen is less than that of U, or of Zr. Thus, the natural chemical evolution of the system is the displacement of oxygen from the quartz or the silica $SiO_2$ toward the actinide alloy in order to favor the maintenance of its oxidation by means of the formation of an undefined layer $M_uSi_vO_w$ as illustrated in FIG. 4 showing the affinity of certain compounds for oxygen.

The interaction between the woven cover and the actinide alloy may then form a complex interaction layer $M_xC_ySi_z$, undefined a priori, but for which the growth (diffusion) kinetics are limited by the temperature (typically some 10 to 100 μm). It should be noted that there are no notable interactions, in the solid state, between SiC and the stainless alloys, in particular the austenitic alloys of 316L type such as the cladding, up to a temperature of more than 1200° C. These alloys may furthermore be filled with SiC during their processing in order to mechanically reinforce them as described in the article: Journal of Materials Science Letters 19 (2000), Vol. 7, pp 613-615; Materials Science and Engineering: A, 335 (2002), Vol. 1-2, pp 1-5.

During operation, the mechanical properties of the SiC weaving (to start with loose at the implementation), make it possible, during the temperature rise, to contain the expansion of the actinide alloy (the expansion coefficient of which is typically three times greater than that of SiC), then to force the metal fuel to be plasticized for the most part in the longitudinal direction. When the fuel/cladding gap is taken up, this SiC makes it possible to ensure good removal of the heat toward the cladding and the coolant, via conductivity (fuel-woven SiC-cladding contact), with, optionally and advantageously, a soft braze of Ni, without overloading the Fe—Cr or Fe—Cr—Ni cladding with stresses (with the suitable sizing).

The porous nature of this weaving of wound turns makes it possible to discharge the fission gases toward the plenum.

Therefore under nominal conditions the interactions that should always be expected or feared at temperature between a metal nuclear fuel under flux and its cladding are here reduced and spread out on principle while by design, the fuel-cladding eutectic cannot be formed (no direct contact).

Behavioral Validations of the Pin of the Present Invention under "Incidental" Operation at Temperatures above the Melting Point of the Metal Fuel Alloy Used At higher temperature, above the melting point of the UPuZr metal fuel, starting from 1000° C. typically, it is the high reactivity and the low corrosion resistance of the SiC by the molten actinides which is interesting. Unlike most other uses, applications or inventions using SiC, the applicant proposes to use SiC as a material of low chemical inertness, used as a consumable, in order to react with the alloy of molten actinides, and to give rise to refractory carbides and silicides that are less dense than the UPuZr metal alloy that gave rise to them.

Figure 5:
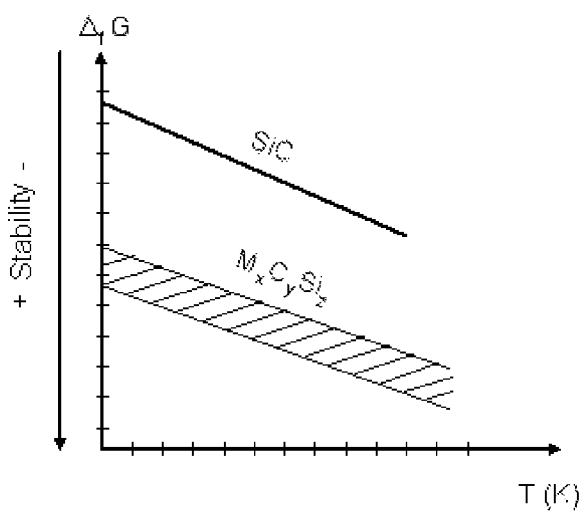
FIG. 5 illustrates the free energies (stability) of various compounds as a function of the temperature.

The SiC may not thermodynamically and kinetically withstand the corrosion of the alloys of molten actinides, and in particular of an alloy such as UPuZr, since the elements Pu, U and Zr have a very strong affinity for carbon, in order to form numerous carbides that are thermodynamically more stable than SiC, and for the Si, in order to form numerous silicides, and mixed carbosilicides $M_xC_ySi_z$; FIG. 5 illustrates, in this regard, the diagram of the relative stability of carbides, silicides or carbodisilicides, showing the free enthalpy formation $\Delta_fG$ (a.u.) for M=U, Pu, Zr.

Figure 6:
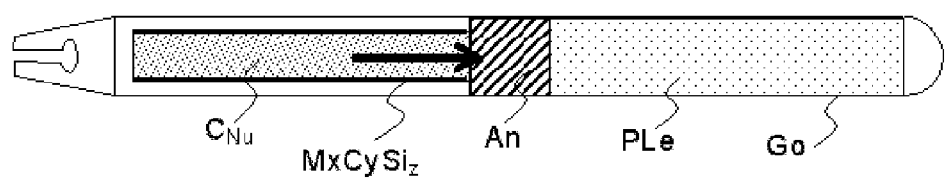
FIG. 6 illustrates the behavior of the nuclear fuel pin of the invention under "incidental" conditions.

Thus the formation of these mixed carbosilicides $M_xC_ySi_z$, illustrated in FIG. 6, follows, these mixed carbosilicides constituting a wall between the cladding and the unmelted nuclear fuel. These less dense refractory compounds reduce the local neutron reactivity since they are less dense, and therefore see their temperature decrease (versus the neutron reaction), since they heat less.

From a simple thermodynamic viewpoint, it is possible to understand on the basis of the physical chemistry of the molten state/SiC interfaces [Survey on wetting of SiC by molten metals, G. W. Liu, M. L. Muolo, F. Valenza, A. Passerone, Ceramics International 36, 4 (May 2010) 1177-1188; Acta metall, mater. Vol. 43, No. 3, pp. 907-912, 1995] and also on reading U—Si binary systems [Journal of Nuclear Materials 389 (2009) 101-107], U—C binary systems [Journal of Nuclear Materials 288 (2001) 100-129], Pu—Si binary systems [Journal of Nuclear Materials, Volume 15, Issue 1, 1965, pages 23-32], Pu—C binary systems [Computer Coupling of Phase Diagrams and Thermochemistry 32 (2008) 371-377], that the thermodynamic activity of carbon or silicon in the molten PU or U increases very rapidly, and that the precipitation of the solids $MSi_x$ ($U_3Si_2$, at 1000° C. typically), $MC_x$ or even $MC_xSi_y$ is imposed thermodynamically relative to the binary compounds: Fe—Si, U—Si, Pu—Si, Pu—C, U—C, Zr—Si.

Therefore, the liquid metal will rapidly form a very complex interaction layer $MSi_xC_y$ made of numerous carbides and silicides of these various elements, which interaction layer is known to be somewhat refractory (the melting points of the compounds are for the most part between 1000 and 1600° C. typically like plutonium silicides [Suppl. to IEEE Transactions on Aerospace, June 1965, Plutonium Compounds for Space Power Applications] and an effective conductor of heat, like most carbides and silicides as described notably in the article: *Journal of Nuclear Materials,* Volume 168, Issues 1-2, October-November 1989, pages 137-143). *Suppl. to IEEE Transactions on Aerospace,* June 1965, *Plutonium Compounds for Space Power Applications.*

The $MSi_xC_y$ compounds formed are less dense than the fuel metal (between 4.9 g.cm$^{-3}$ for $ZrSi_2$, between 7-8 and 10 g.cm$^{-3}$ for silicides of U and of Pu) and, on average, less dense than the average of the densities of the volumes of SiC (advantageously filled with Si) and of molten actinide that gave rise to these compounds.

Due to the dedensification, the molten metal, likened to a liquid tube that has not yet reacted is mechanically discharged upwards as indicated by the arrow in FIG. 6, carrying along possible less dense $MSi_xC_y$ products or floating by de facto decreasing the density of fissile atoms locally in the fissile column (in situ creation of a composite nuclear fuel, for which the density of heavy atoms is lower) by the effect of radial compression and closure of said liquid tube, during the progression of the interaction.

The expansion vessel of the molten actinide alloy (in the plenum) is protected from the corrosive nature of the molten fuel, and notably of plutonium, by the tantalum Ta coating of materials conventionally used for this type of problem (see for example patent FR 2 752 234 from 1998 describing a stainless steel/Ta/stainless steel composite cradle developed by CEA/DAM in order to contain the liquid alloys of Pu—Ga).

In principle, any chemical reaction producing compounds that are solid and less dense at the temperature considered, and that are not very dense, may enable an operation such as that described.

Figure 7A:
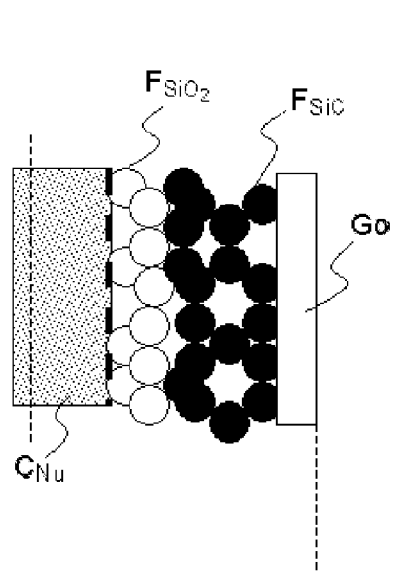
FIGS. 7*a* and 7*b* illustrate the formation of interaction layers of MxCySiz materials with MuSivOw oxides during "incidental" melting of metal nuclear fuel.
Figure 7B:
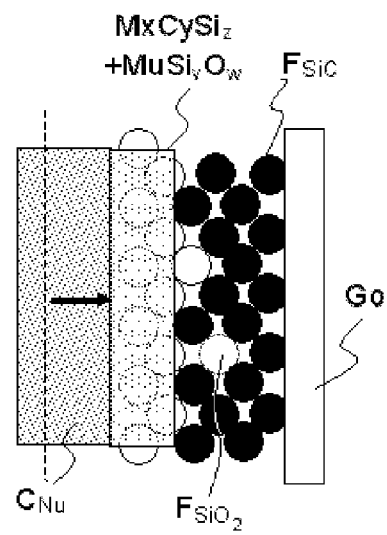

FIGS. 7a and 7b thus schematically show, with transverse cross sections, the evolution of the metal nuclear fuel $C_{Nu}$/primary shell constituted of fibers $F_{SiO2}$ of silica/main shell constituted of fibers $F_{SiC}$ of SiC/cladding Go interfaces, during the reaction for melting the nuclear fuel with the appearance of an additional interface of molten metal nuclear fuel that has reacted with the SiC in order to give rise to compounds $M_xC_yS_{iz}$ and oxides $M_uSi_vO_w$. The nuclear fuel $C_{Nu}$ is expanded and swollen, the constituent turns of the main shell made of $F_{SiC}$ being compressed against the cladding Go.

The invention claimed is:

1. A nuclear fuel pin comprising a linear element defined by a bar or billet in a cylindrical shape of metal nuclear fuel material including uranium and/or plutonium and a cladding comprising Fe and Cr or an alloy comprising at least these two elements, further comprising: a main shell positioned around the linear element of metal nuclear fuel material, said main shell being disposed between an inside surface of the cladding and the linear element of metal nuclear fuel material, said main shell comprising yarns or fibers made of SiC; and a primary shell of silica or quartz fibers inserted between the linear element of metal nuclear fuel material and the main shell, the primary shell being disposed directly onto an outer surface of the cylinder of metal nuclear fuel material.

2. The nuclear fuel pin as claimed in claim 1, further comprising:
  a plenum to receive said discharge of fission gasses; and
  a reservoir, wherein the linear element is disposed at a first end of said nuclear fuel pin, the plenum is disposed at a second end of said nuclear fuel pin, and said reservoir is disposed between said plenum and said linear element, the cladding is configured to cover and contain said linear element, said reservoir, and said plenum.

3. The nuclear fuel pin as claimed in claim 2, wherein said reservoir comprises an annulus made of a material which is resistant to a corrosion of molten actinides.

4. The nuclear fuel pin as claimed in claim 3, wherein said annulus is made of tantalum.

5. The nuclear fuel pin as claimed in claim 1, wherein the SiC constituting the fibers is of cubic β allotropic variety.

6. The nuclear fuel pin as claimed in claim 1, wherein the main shell also comprises free Si fillers.

7. The nuclear fuel pin as claimed in claim 1, wherein said main shell comprises strips comprising SiC yarns or fibers.

8. The nuclear fuel pin as claimed in claim 1, wherein the main shell comprises a plurality of wrapped layers of SiC fibers wound around the linear element of metal nuclear fuel material.

9. The nuclear fuel pin as claimed in claim 8, wherein the primary shell comprises a plurality of wrapped layers of silica or quartz fibers wound around the linear element of metal nuclear fuel material.

10. A process for manufacturing a metal nuclear fuel pin as claimed in claim 1, further comprising the production of the main shell around the linear element of metal nuclear fuel material by weaving or braiding SiC fibers.

11. The process for manufacturing a metal nuclear fuel pin as claimed in claim 10, further comprising a prior step of surface oxidation of the linear element of metal nuclear fuel material.

12. The process for manufacturing a metal nuclear fuel pin as claimed in claim 10, further comprising a prior step of coating the linear element of metal nuclear fuel material with a binder comprising a soft brazing powder, the soft brazing powder including a conductive material.

13. The process for manufacturing a metal nuclear fuel pin as claimed in claim 10, further comprising the production of the primary shell between the linear element of metal nuclear fuel material and the main shell, said primary shell comprising silica or quartz fibers.

14. A process for manufacturing a metal nuclear fuel pin as claimed in claim 1, further comprising the production of the main shell with strips of SiC fibers wound around the linear element of metal nuclear fuel material.

15. The nuclear fuel pin as claimed in claim 1, wherein the primary shell comprises a plurality of wrapped layers of silica or quartz fibers wound around the linear element of metal nuclear fuel material.

* * * * *